United States Patent
Yoon et al.

(10) Patent No.: US 9,546,445 B2
(45) Date of Patent: Jan. 17, 2017

(54) MOTOR AND WASHING MACHINE HAVING THE SAME

(71) Applicant: SAMSUNG ELECTRONICS CO., LTD., Suwon (KR)

(72) Inventors: Keun Young Yoon, Hwaseong (KR); Young Kwan Kim, Anyang (KR); Deok Jin Kim, Hwaseong (KR); Su Kwon Jeong, Suwon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 722 days.

(21) Appl. No.: 13/788,675

(22) Filed: Mar. 7, 2013

(65) Prior Publication Data

US 2013/0233026 A1 Sep. 12, 2013

(30) Foreign Application Priority Data

Mar. 7, 2012 (KR) .................. 10-2012-0023475

(51) Int. Cl.
*D06F 37/30* (2006.01)
*H02K 1/14* (2006.01)

(52) U.S. Cl.
CPC ............. *D06F 37/30* (2013.01); *D06F 37/304* (2013.01); *H02K 1/14* (2013.01); *H02K 1/141* (2013.01)

(58) Field of Classification Search
CPC .......... D06F 37/30; D06F 37/304; H02K 1/14; H02K 1/141
See application file for complete search history.

(56) References Cited

U.S. PATENT DOCUMENTS

| 3,984,711 | A | * | 10/1976 | Kordik | H02K 37/20 310/154.07 |
| 2007/0236099 | A1 | * | 10/2007 | Kim | D06F 7/304 310/266 |
| 2010/0072832 | A1 | | 3/2010 | Zhu et al. | |
| 2010/0270962 | A1 | * | 10/2010 | Yoon | D06F 3/02 318/446 |
| 2011/0036127 | A1 | * | 2/2011 | Lee | D06F 7/304 68/140 |

(Continued)

FOREIGN PATENT DOCUMENTS

| CN | 1437304 | 8/2003 |
| CN | 1667916 | 9/2005 |

(Continued)

OTHER PUBLICATIONS

Chinese Office Action dated Dec. 31, 2015 from Chinese Patent Application No. 201310072648.5, 13 pages.

(Continued)

*Primary Examiner* — Joseph L Perrin
(74) *Attorney, Agent, or Firm* — Staas & Halsey LLP (57) ABSTRACT

Disclosed herein is a washing machine having an improved structure that maintains efficiency over a certain level both in washing and dehydration. The washing machine includes a body, a tub disposed within the body, a drum rotatably disposed within the tub, and a motor coupled to a rear surface of the tub to drive the drum. The motor includes a stator including a plurality of stator cores and a plurality of magnets arranged between the stator cores, and a rotor rotatably disposed at an inner side or outer side of the stator.

9 Claims, 10 Drawing Sheets

(56) References Cited

U.S. PATENT DOCUMENTS

| | | | | |
|---|---|---|---|---|
| 2012/0181880 A1* | 7/2012 | Zhao | .......................... | D06F 7/30 |
| | | | | 310/43 |
| 2012/0306297 A1* | 12/2012 | Kim | .................... | H02K 19/103 |
| | | | | 310/46 |
| 2012/0306298 A1* | 12/2012 | Kim | ...................... | H02K 1/141 |
| | | | | 310/46 |
| 2013/0199249 A1* | 8/2013 | In | .......................... | H02K 1/165 |
| | | | | 68/140 |

FOREIGN PATENT DOCUMENTS

| | | |
|---|---|---|
| CN | 101741196 | 6/2010 |
| CN | 101997346 | 3/2011 |
| EP | 2169804 | 3/2010 |

OTHER PUBLICATIONS

Chinese Office Action dated Aug. 19, 2016 from Chinese Patent Application No. 201310072648.5, 6 pages.

* cited by examiner

MOTOR AND WASHING MACHINE HAVING THE SAME

CROSS-REFERENCE TO RELATED APPLICATIONS

This application claims the benefit of Korean Patent Application No. 10-2012-0023475, filed on Mar. 7, 2012 in the Korean Intellectual Property Office, the disclosure of which is incorporated herein by reference.

BACKGROUND

1. Field

Embodiments of the present disclosure relate to a motor to generate rotational force and a washing machine having the same.

2. Description of the Related Art

A washing machine, which washes clothes using electricity, is provided with a tub to reserve wash water, a drum rotatably installed within the tub, and a motor to rotate the drum.

Operation of a washing machine is divided into washing, during which dirt on the laundry is removed, and dehydration, during which the cleaned laundry is dehydrated. The drum rotates at low speed in washing operation with water contained therein, and rotates at high speed with water not contained therein when performing dehydration.

The motor mounted to the washing machine should meet these two speed conditions for operation of the washing machine. That is, the motor needs to rotate the drum with high torque for washing operation and to rotate drum at high speed in dehydration operation.

However, with a brushless direct current (BLDC) motor mounted to a conventional washing machine, it may be difficult to meet these two rotation conditions for operation of the washing machine.

SUMMARY

Therefore, it is an aspect of the present disclosure to provide a motor which has an improved structure ensuring that the motor operates with efficiency over a certain level in both washing and dehydration operations of a washing machine and a washing machine having the same.

Additional aspects will be set forth in part in the description which follows and, in part, will be obvious from the description, or may be learned from practice of the invention.

In accordance with one aspect, a washing machine includes a body, a tub disposed within the body, a drum rotatably disposed within the tub, and a motor coupled to a rear surface of the tub to drive the drum, wherein the motor includes a stator including a plurality of stator cores and a plurality of magnets arranged between the stator cores, and a rotor rotatably disposed at an inner side or outer side of the stator.

Each of the stator cores may include a core body shaped in a circular arc, and a plurality of supports adapted to extend from the core body in a radial direction of the core body to support the magnets disposed on both sides of the core body.

The stator may include a first coil wound around the neighboring ones of the supports of a first one and a second one of the stator cores neighboring each other.

The stator may include a second coil wound around one of the magnets disposed between the neighboring ones of the supports.

The first coil may be positioned at an outer side of the second coil.

The magnets may have a shorter length than the stator cores in an axial direction of the stator.

The stator may include an insulator to cover the stator cores and the magnets to electrically insulate the stator cores and the magnets from the first coil and the second coil.

The rotor may include a rotor body formed in a circular shape, and a plurality of rotor cores adapted to extend from the rotor body in a radial direction of the rotor body, and arranged in a circumferential direction of the rotor body.

In accordance with one aspect, a motor includes a stator including a plurality of stator cores radially arranged separated from each other and a plurality of magnets inserted between the stator cores to form magnetic flux, and a rotor to electrically interact with the stator to rotate, the rotor including a rotor body and a plurality of rotor cores arranged in a circumferential direction of the rotor body.

Two neighboring ones of the stator cores may define a magnet accommodating portion therebetween to accommodate at least one of the magnets inserted thereinto.

Each of the stator cores may include a plurality of supports arranged parallel with the magnets to support the magnets, and a connector to connect the supports to each other.

The stator may include a first coil wound around neighboring ones of the supports of two different ones of the stator cores having at least one magnet of the magnets disposed therebetween to form magnetic flux in a first direction.

The stator may include a second coil wound around the at least one magnet to form magnetic flux in a direction different from the first direction.

The magnetic flux formed through the second coil according to electric current applied to the second coil may be superimposed on the magnetic flux formed by the magnet, or cancel out the magnetic flux formed by the magnet.

The first coil may be wound outside the second coil.

The at least one magnet may have a shorter length than the stator cores in an axial direction of the stator.

The stator may include a molding portion to connect the stator cores separated from each other.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to the embodiments, examples of which are illustrated in the accompanying drawings, wherein like reference numerals refer to like elements throughout. Hereinafter, a description will be given of a washing machine with a motor, which is applicable to all kinds of apparatuses including an air conditioner, an electric vehicle, a light rail system, an electric bicycle and a small generator that employ a motor as a power source.

Figure 1:
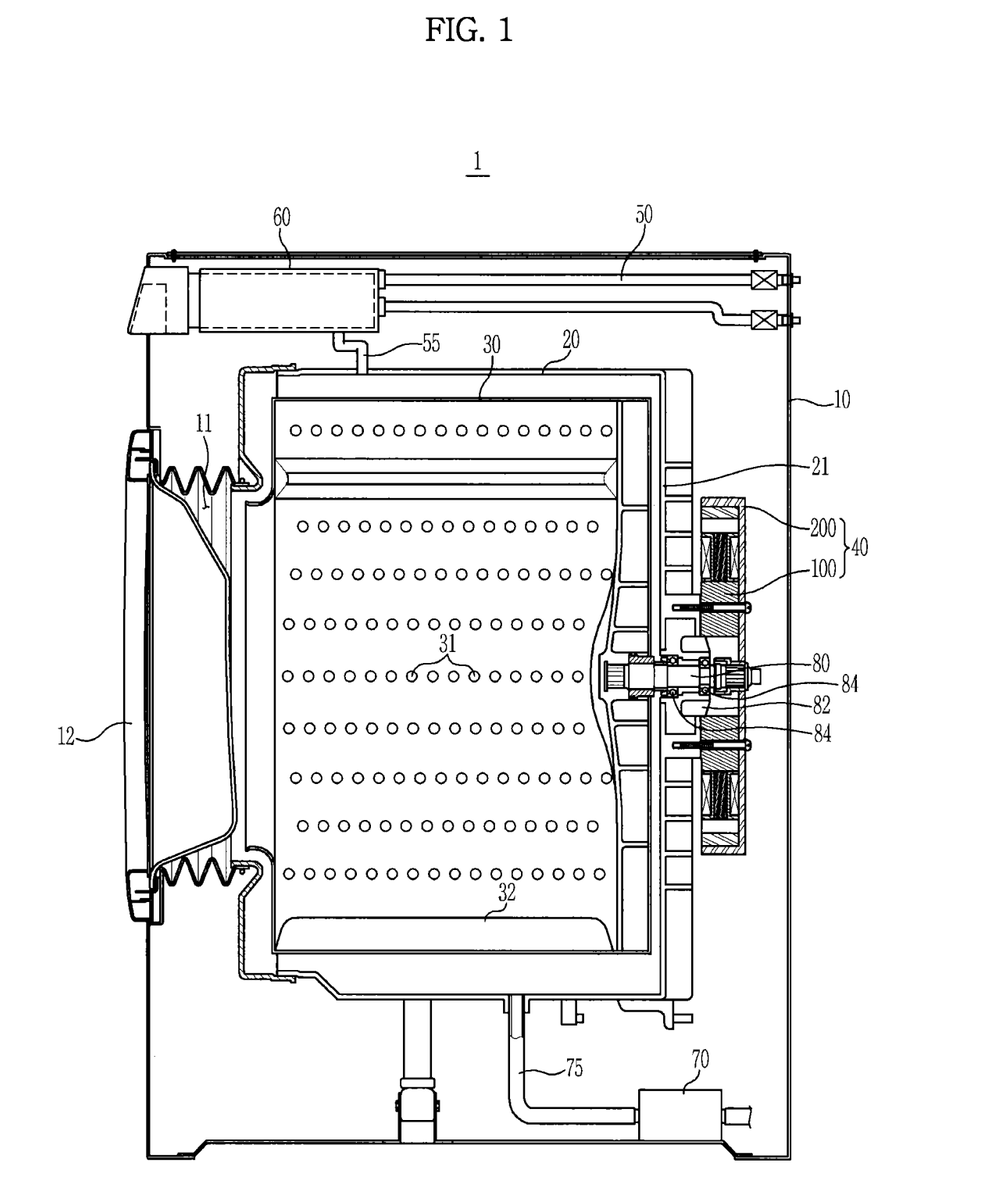
FIG. 1 is a view illustrating a washing machine in accordance with an exemplary embodiment.

FIG. 1 is a view illustrating a washing machine in accordance with an exemplary embodiment.

As shown in FIG. 1, the washing machine 1 includes a cabinet 10 forming the outward appearance of the washing machine 1, a tub 20 disposed within the cabinet 10, a drum 30 rotatably disposed within the tub 20, and a motor 40 to rotate the drum 30.

The front portion of the cabinet 10 is provided with an inlet 11 through which laundry may be inserted into the drum 30. The inlet 11 is opened and closed by a door 12 installed at the front of the cabinet 10.

A water supply pipe 50 to supply wash water to the tub 20 is installed at the upper portion of the tub 20. One end of the water supply pipe 50 is connected to an external water supply source (not shown), and the other end of the water supply pipe 50 is connected to a detergent supply unit 60. The detergent supply unit 60 is connected to the tub 20 through a connection pipe 55. Water flowing into the water supply pipe 50 is supplied to the tub 20 along with a detergent via the detergent supply unit 60.

Installed at the bottom of the tub 20 are a drain pump 70 and drain pipe 75 to discharge the water in the tub 20 from the cabinet 10.

A plurality of through holes 31 is formed around the drum 30 to allow flow of wash water therethrough, and a plurality of lifters 32 is installed on the inner circumferential surface of the drum 30 to allow the laundry to tumble during rotation of the drum 30.

The drum 30 and motor 40 are connected to each other through a drive shaft 80. The drive shaft 80 transmits the rotational force of the motor 40 to the drum 30. One end of the drive shaft 80 is connected to the drum 30, and the other end of the drive shaft 80 extends outside a rear wall of the tub 20.

Installed at the rear wall 21 of the tub 20 is a bearing housing 82 by which the drive shaft 80 is rotatably supported. The bearing housing 82 may be formed of an aluminum alloy, and may be inserted the rear wall 21 of the tub 20 when the tub 20 is manufactured through injection molding. Bearings 84 are installed between a bearing housing 82 and the drive shaft 80 to ensure smooth rotation of the drive shaft 80.

Hereinafter, a detailed description will be given of the structure and principles of the motor 40 mounted at the rear wall 21 of the tub 21 of the washing machine 1.

Figure 2:
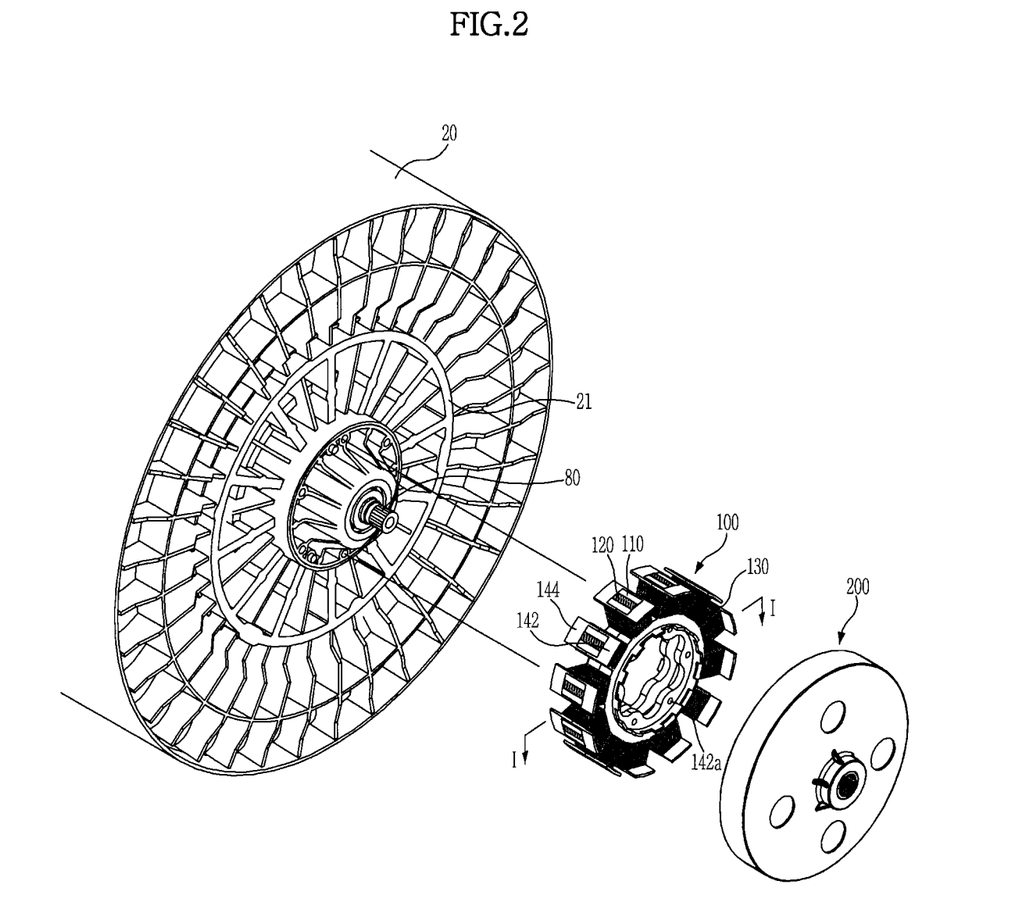
FIG. 2 is a view illustrating a stator and rotor of a motor in accordance with the exemplary embodiment.
Figure 3:
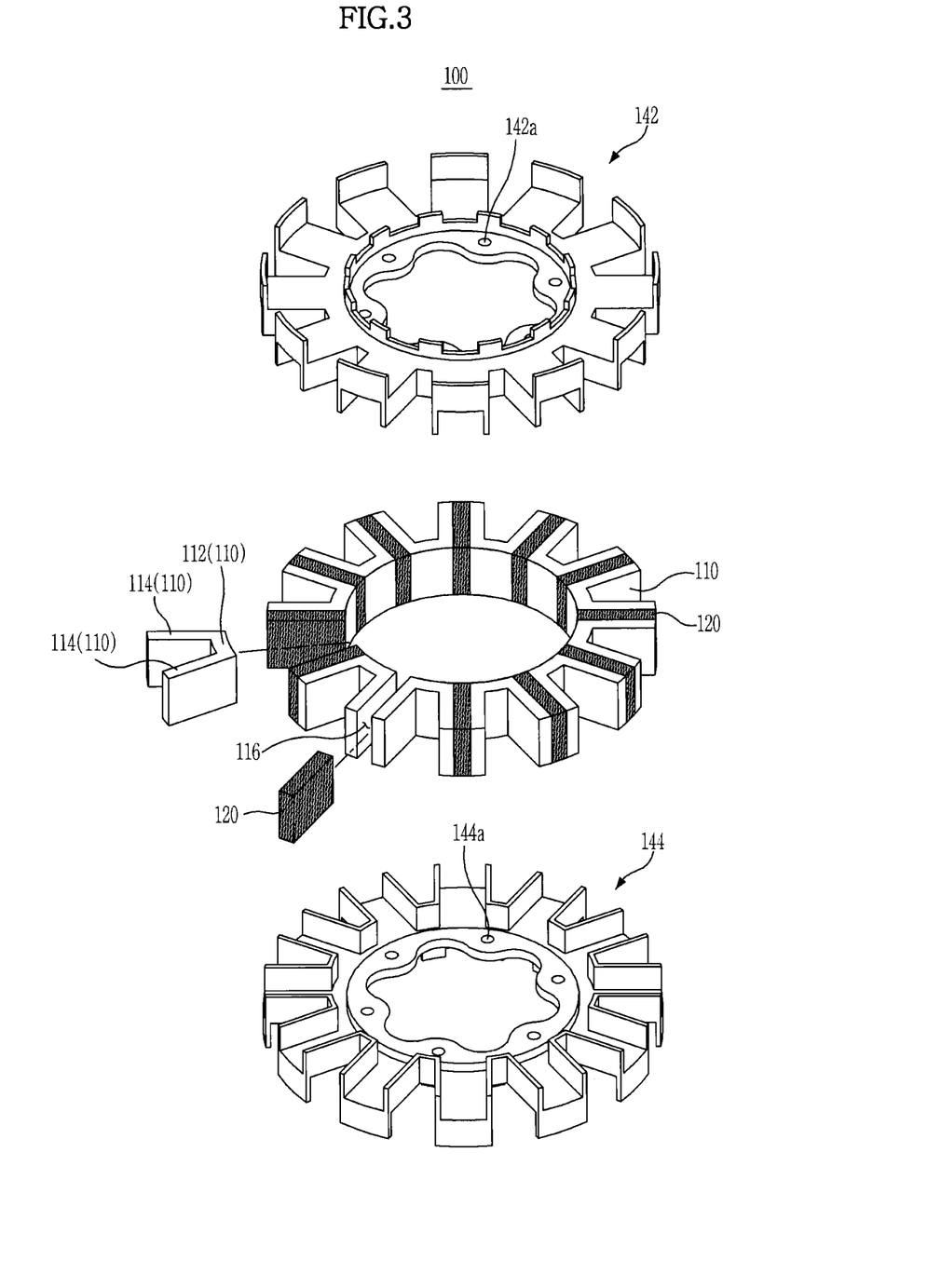
FIG. 3 is an exploded perspective view illustrating the stator of FIG. 2.
Figure 4:
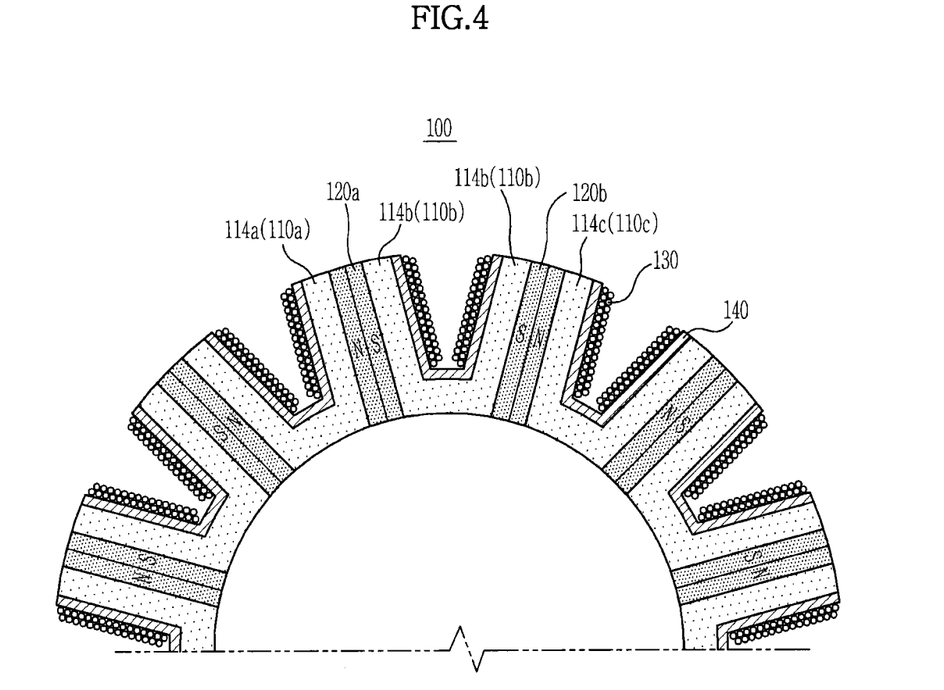
FIG. 4 is a cross-sectional view taken along the line I-I of FIG. 2.
Figure 5:
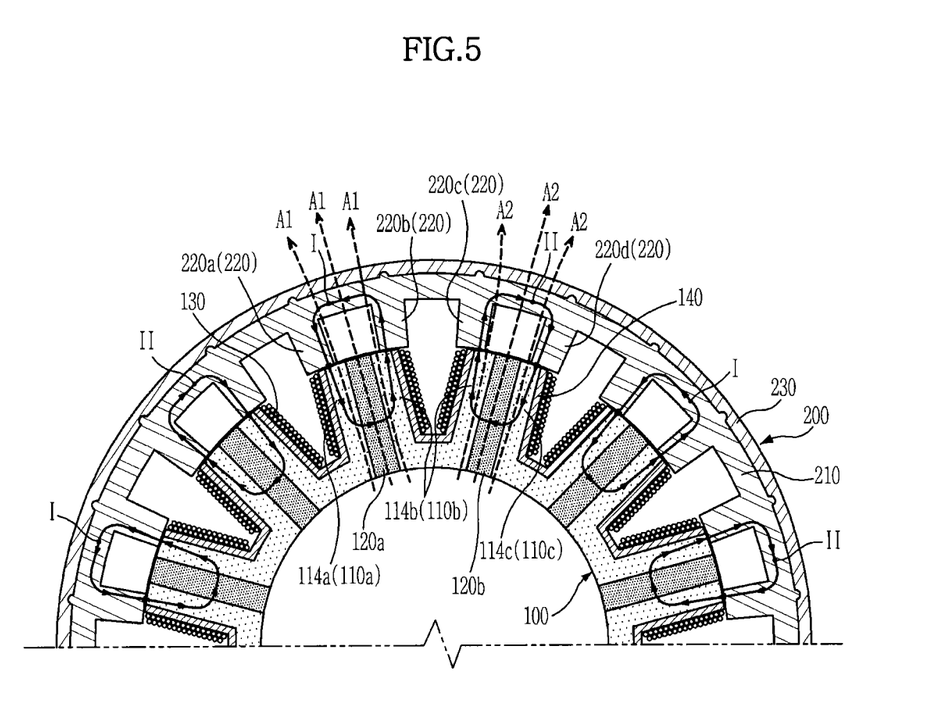
FIG. 5 is a view illustrating magnetic flux flow between the stator and rotor of FIG. 2.
Figure 6:
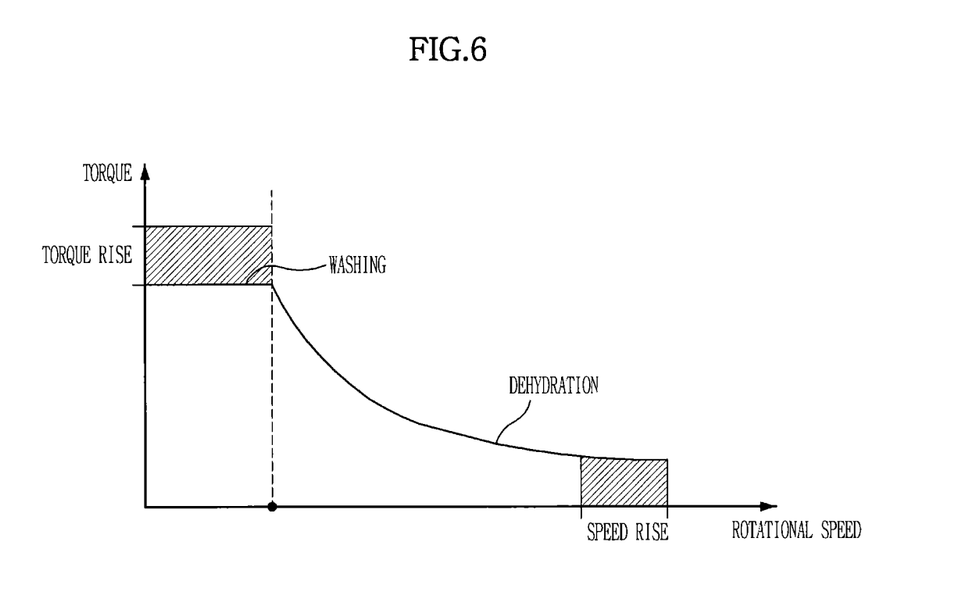
FIG. 6 is a graph illustrating the characteristics of the motor in accordance with the exemplary embodiment.

FIG. 2 is a view illustrating a stator and rotor of a motor in accordance with an exemplary embodiment, FIG. 3 is an exploded perspective view illustrating the stator of FIG. 2, FIG. 4 is a cross-sectional view taken along the line I-I of FIG. 2, illustrating the magnetic flux flow among the coil, stator core and magnets, FIG. 5 is a view illustrating the magnetic flux flow between the stator and rotor of FIG. 2, and FIG. 6 is a graph illustrating the characteristics of the motor in accordance with the exemplary embodiment of the present invention. The coil is not shown in FIG. 3. The motor according to embodiments may be an inner rotor-type motor which has a rotor disposed inside the stator, or an outer rotor-type motor which has a rotor disposed outside the stator. For convenience of description, the motor will hereinafter be assumed to be of the outer rotor type.

As shown in FIGS. 1 to 5, the motor 40 according to the illustrated embodiment is coupled to the outside of the tub 20 to drive the drum 30 to rotate in both directions. The motor 40 includes a stator 100 mounted at the rear wall 20 of the tub 20, and a rotor 200 disposed around the stator 100 to electrically interact with the stator 100 to rotate.

The stator 100 includes a plurality of stator cores 110 radially arranged separated from each other and formed of a metal, a plurality of magnets 120 coupled between the stator cores 110, a coil 130 wound around the stator cores 110 and magnets 120, and an insulator 140 to cover the stator cores 110 and magnets 120.

Each of the stator cores 110 includes a core body 112 shaped in a circular arc, and a plurality of supports 114 extending from the core body 112 in a direction in which the radius of the core body 112 increases. The core body 112 and the plurality of supports 114 of the stator cores 110 forms, for example, a V-shape configuration. The supports 114 are connected to both sides of the core body 112 to support the magnets 120 positioned on both sides of the stator core 110, in the circumferential direction of the stator core 110. The distance between the supports 114 widens along the direction in which the supports 114 extends. The core body 112 may be seen as a connector since it connects the supports 114 arranged on both sides thereof.

The stator cores 110 are arranged equally spaced apart in the circumferential direction of the stator 100 to define a magnet accommodating portion 116 therebetween to accommodate at least one magnet 120.

Since the stator cores 110 are completely separated from each other, leakage of magnetic flux of the magnet 120 by flowing into the neighboring stator cores 110 may be prevented.

As the stator core 110 forms a path of magnetic flux through which a magnetic field is formed, it may be fabricated by processing and stacking metallic plates through press working.

The magnets 120, which are disposed between the stator cores 110, are arranged in the circumferential direction of the stator 100 to be radially positioned around the stator 100. The magnet 120 may contain a rare-earth element such as ferrite, neodymium and samarium which may semi-permanently maintain the magnetic property of high energy density.

The magnetic fluxes created by the magnets 120 are arranged in the circumferential direction of the stator 100, and the neighboring magnets 120 are disposed such that the portions thereof facing each other have the same polarity. If a magnetic circuit is formed in this way, the concentration of magnetic fluxes generated by the magnets 120 may be enhanced, and thus it may be possible to reduce the size of the motor 40 while improving the performance thereof.

The insulator 140 includes an upper insulator 142 and lower insulator 144 to vertically cover the stator cores 110 and magnets 120. The upper insulator 142 and lower insulator 144 are vertically coupled to each other to support and combine the stator cores 110 and magnets 120 and to electrically insulate the stator cores 110 and magnets 120 from the coil 130. Also, the upper insulator 142 and lower insulator 144 include a plurality of fixing holes 142a and a plurality of fixing holes 144a respectively to fix the stator 100 to the rear wall 21 of the tub 20. The upper insulator 142 and lower insulator 144 may be fabricated through injection molding of plastics having the property of electrical insulation, and the fixing holes 142a and 144a may be integrally formed respectively in the upper insulator 142 and lower insulator 144 during injection molding process. Although not shown, instead of providing the upper insulator 142 and lower insulator 144 separately for the insulator 140, the insulator 140 may be integrated with the stator cores 110 and magnets 120 by inserting the stator cores 110 and magnets 120 into a mold used to fabricate the insulator 140 in injection molding.

The coil 130 is wound around neighboring supports 114a and 114b of a first stator core 110a and second stator core 110b neighboring each other among other stator cores 110. When electric current is supplied to the coil 130, a magnetic field is formed in the radial direction of the stator 100 in accordance with the principle of electromagnetic induction.

The coil 130 may be wound to form 3-phase windings. If 3-phase alternating current (AC) power is applied to the coil 130, a 3-phase rotating magnetic field is created at the stator 100. By the 3-phase rotating magnetic field formed at the stator 100, the rotor 200 is rotated around the stator 100.

The rotor 200 includes a rotor body 210 formed in a circular shape, a plurality of rotor cores 220 extending inward from the rotor body 210 in a radial direction of the rotor body 210 and arranged spaced apart from each other in the circumferential direction of the rotor body 210, a rotor frame 230 to combine the rotor 200 with the drive shaft 80. As the rotor body 210 and rotor cores 220 define, along with the stator 100, a path of magnetic flux allowing a magnetic field formed at the stator 100 to pass therethrough, they may be formed by processing and stacking metallic plates through press working.

Hereinafter, a description will be given of how the rotor 200 is rotated by electromagnetic interaction between the stator 100 and rotor 200 of the motor according to the illustrated embodiment of the present invention.

As shown in FIGS. 4 and 5, the magnets 120 disposed between the stator cores 110 have alternately arranged polarities such that the portions of the magnets 120 facing each other have the same polarity, thereby allowing concentrated magnetic flux to be created in the circumferential direction of the stator 100.

The magnetic flux created by a first magnet 120a disposed between the first stator core 110a and the second stator core 110b forms a closed loop path (I) along a support 114b of the second stator core 110b adjoining the first magnet 120a, a second rotor core 220b, a rotor body 210, a first rotor core 220a, and a support 114a of the first stator core 110a adjoining the first magnet 120a, while the magnetic flux created by a second magnet 120b disposed between the second stator core 110b and the third stator core 110c forms a closed loop path (II) along a support 114b of the second stator core 110b adjoining the second magnet 120b, a third rotor core 220c, a rotor body 210, a fourth rotor core 220d, and a support 114c of the third stator core 110c adjoining the second magnet 120b. Other magnets 120 arranged alternately with the first magnet 120a or the second magnet 120b also form the same closed loop path of magnetic flux as those of the first magnet 120a and second magnet 120b.

When AC power is applied to the coil 130 wound around the stator 100, magnetic fluxes A1 and A2 are formed around the coil 130 in a radial direction. The magnetic fluxes formed around the coil 130 are superimposed on the magnetic fluxes formed by the magnets 120 to increase the magnetic flux density or to cancel the magnetic fluxes formed by the magnets 120 to decrease the magnetic flux density. As shown in FIG. 5, the magnetic flux A1 formed around the coil 130 decreases the density of magnetic flux formed in and around the support 114a of the first stator core 110a, and increases the density of magnetic flux formed in and around the support 114b of the second stator core 110b. Likewise, the magnetic flux A2 formed around the coil 130 decreases the density of magnetic flux formed in and around the support 114c of the third stator core 110c, and increases the density of magnetic flux formed in and around the support 114b of the second stator core 110b.

The directions and densities of magnetic fluxes formed, around the stator cores 110 including the first stator core 110a, second stator core 110b and third stator core 110c, by the magnets 120 may be controlled by adjusting the AC power applied to the coil 130, and the speed and direction of rotation of the rotor 200 controlled by adjusting the densities of the magnetic fluxes around the stator cores 110.

As such, by using both the magnetic flux created by the magnet 120 inserted between the stator cores 110 and the magnetic flux created by the coil 130 wound around the magnet 120, the density of magnetic flux formed around the stator 100 may be adjusted in a wide range. That is, as shown in FIG. 6, toque may be increased in a region of operation of the washing machine 1 such as washing which requires high torque by adjusting the AC power applied to the coil 130 to allow the magnetic flux created by the magnet 120 to be superimposed on the magnetic flux created by the coil 130, and the rotational speed of the rotor 200 may be increased in a region of operation of the washing machine 1 such as dehydration which requires high rotational speed by adjusting the AC power applied to the coil 130 to allow the magnetic flux created by the magnet 120 and the magnetic flux created by the coil 130 to cancel each other out.

Hereinafter, a motor 40a according to one embodiment will be described in detail. For convenience of description, description of the parts of the motor 40a identical to those of the motor 40 is omitted.

Figure 7:
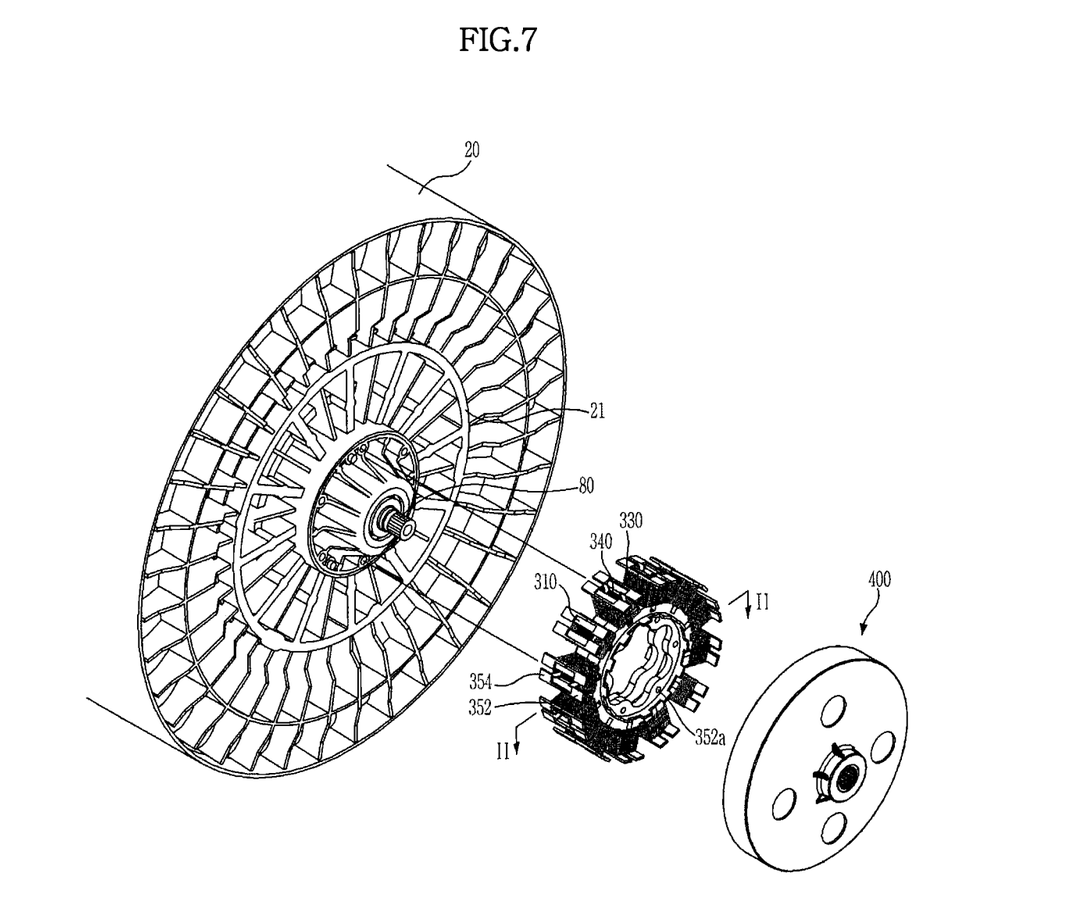
FIG. 7 is a view illustrating a stator and rotor of a motor in accordance with one embodiment.
Figure 8:
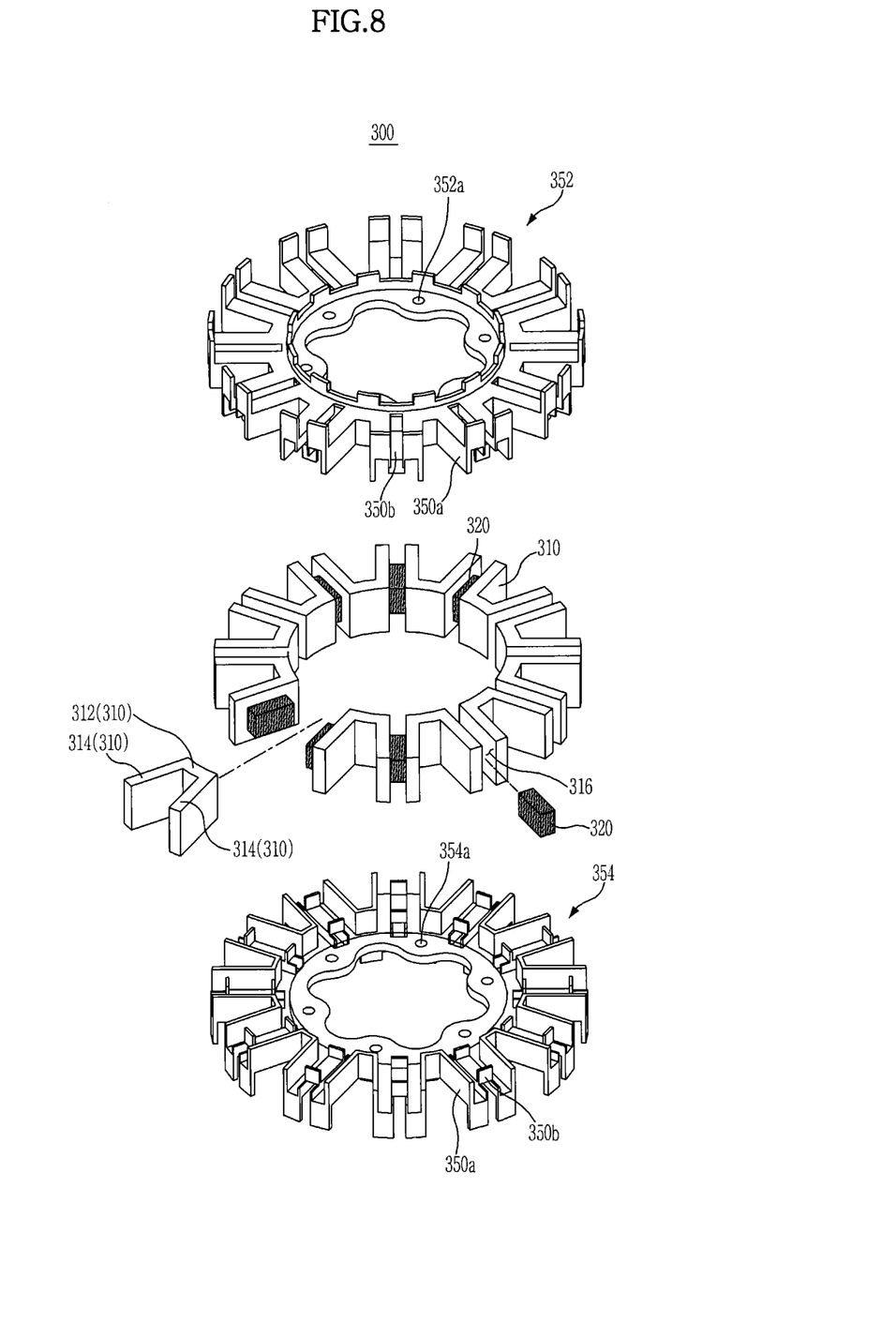
FIG. 8 is an exploded perspective view illustrating the stator of FIG. 7.
Figure 9:
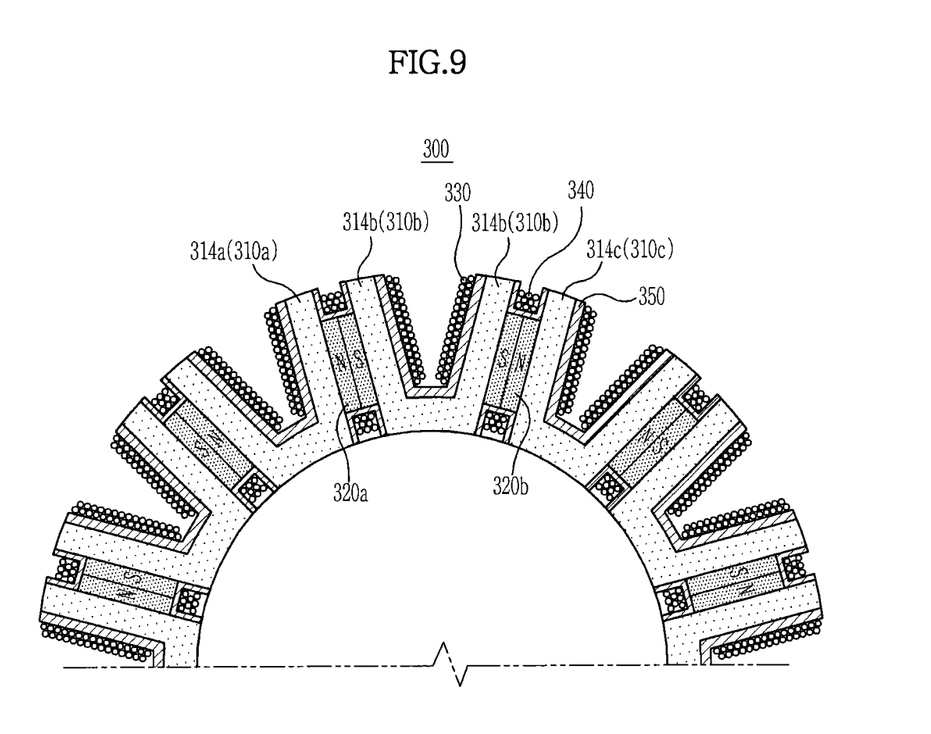
FIG. 9 is a cross-sectional view taken along the line II-II of FIG. 7.
Figure 10:
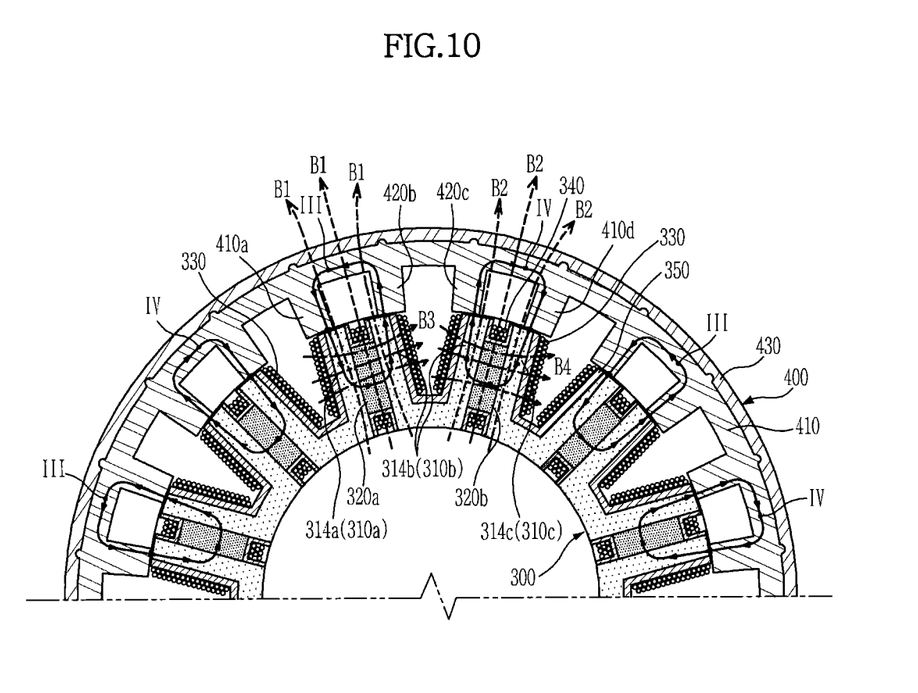
FIG. 10 is a view illustrating magnetic flux flow through the stator and rotor of FIG. 7.

FIG. 7 is a view illustrating a stator and rotor of a motor in accordance with one embodiment, FIG. 8 is an exploded perspective view illustrating the stator of FIG. 7, FIG. 9 is a cross-sectional view taken along the line II-II of FIG. 7, illustrating magnetic flux flow through a coil, stator core, and magnet, and FIG. 10 is a view illustrating magnetic flux flow through the stator and rotor of FIG. 7. The coil is omitted from FIG. 8.

As shown in FIGS. 7 to 10, the motor 40a according to the illustrated embodiment of the preset invention includes a stator 300 mounted at the rear wall 21 of the tub 20, and a rotor 400 disposed around the stator 300 to electrically interact with the stator 300 to rotate.

The stator 300 includes a plurality of stator cores 310 radially arranged spaced apart from each other and formed of a metal, a plurality of magnets 320 coupled between the stator cores 310, a first coil 330 and a second coil 340 wound around the stator cores 310 and magnets 320, and an insulator 350 to cover the stator cores 310 and magnets 320.

Each of the stator cores 310 includes a core body 312 shaped in a circular arc, and a plurality of supports 314 extending from the core body 312 in a direction in which the radius of the core body 312 increases. The supports 314 are connected to both sides of the core body 312 to support, in the circumferential direction of the stator core 310, the magnets 320 positioned at both sides of the stator core 310. The distance between the supports 314 widens along the direction in which the supports 314 extends. The core body 312 and the plurality of supports 314 of the stator cores 310 forms, for example, a V-shape configuration. The core body 312 may be seen as a connector since it connects the supports 314 arranged on both sides thereof.

The stator cores 310 are arranged equally spaced apart in the circumferential direction of the stator 300 to define a magnet accommodating portion 116 therebetween to accommodate at least one magnet 320.

Since the stator cores 310 are completely separated from each other, leakage of magnetic flux of the magnet 320 through flow into the neighboring stator cores 310 may be prevented.

As the stator core 310 forms a path of magnetic flux through which a magnetic field is formed, it may be fabricated by processing metallic plates in press working and stacking the same.

The magnets 320, which are disposed between the stator cores 310, are arranged in the circumferential direction of the stator 300 to be radially positioned around the stator 300. To form windings of the second coil 340, the magnets 320 may be adapted to have a shorter length than the stator cores 310 in the axial direction of the stator 300. As shown in FIG. 8, the magnet 320 may be formed in a rectangular shape. Although not shown in FIG. 8, each corner of the magnet 320 may be rounded, or the magnet 320 may be formed in various shapes such as circular and polygonal shapes. The magnet 320 may contain a rare-earth element such as ferrite, neodymium and samarium which may semi-permanently maintain the magnetic property of high energy density.

The magnetic fluxes created by the magnets 320 are arranged in the circumferential direction of the stator 300, and the neighboring magnets 320 are disposed such that the portions thereof facing each other have the same polarity. If a magnetic circuit is formed in this way, the concentration of magnetic flux generated by the magnets 320 may be enhanced, and thus it may be possible to reduce the size of the motor 40a while improving the performance thereof.

The insulator 350 includes an upper insulator 352 and lower insulator 354 to vertically cover the stator cores 310 and magnets 320. The upper insulator 352 and lower insulator 354 are vertically coupled to each other to support and combine the stator cores 310 and magnets 320 and to electrically insulate the stator cores 310 and magnets 320 from the first coil 330 and second coil 340. Also, the upper insulator 352 and lower insulator 354 include a plurality of fixing holes 352a and a plurality of fixing holes 354a to fix the stator 300 to the rear wall 21 of the tub 20. The upper insulator 352 and lower insulator 354 may be fabricated through injection molding of plastics having the property of electrical insulation, and the fixing holes 352a and 354a may be integrally formed respectively in the upper insulator 352 and lower insulator 354 during injection molding of the upper insulator 352 and lower insulator 354. Although not shown, instead of providing the upper insulator 352 and lower insulator 354 separately for the insulator 350, the insulator 350 may be integrated with the stator cores 310 and magnets 320 by inserting the stator cores 310 and magnets 320 into a mold used to injection mold the insulator 350.

The insulator 350 includes a first coil wound portion 350a wound by the first coil 330, and a second coil wound portion 350b wound by the second coil 340. The first coil wound portion 350a and second coil wound portion 350b are connected to each other, and are arranged in a stepped manner such that when the first coil 330 and the second coil 340 do not interfere with each other when windings thereof are formed around the first coil wound portion 350a and second coil wound portion 350b.

The first coil 330 is wound around neighboring supports 314a and 314b of a first stator core 310a and second stator core 310b neighboring each other among other stator cores 310. When electric current is supplied to the first coil 330, a magnetic field is formed in the radial direction of the stator 300 in accordance with the principle of electromagnetic induction.

The first coil 330 may be wound to form 3-phase windings. If 3-phase AC power is applied to the first coil 330, a 3-phase rotating magnetic field is created at the stator 300. By the 3-phase rotating magnetic field formed at the stator 300, the rotor 400 is rotated about the stator 300.

The second coil 340 is wound, in a different direction than the first coil 330, around the magnet 320 disposed between the first stator core 310a and the second stator core 310b neighboring each other among other stator cores 310. When electric current is supplied to the coil 340, a magnetic field is formed in the circumferential direction of the stator 300 in accordance with the principle of electromagnetic induction.

The rotor 400 includes a rotor body 410 formed in a circular shape, a plurality of rotor cores 420 extending inward from the rotor body 210 in a radial direction of the rotor body 410 and arranged spaced apart from each other in the circumferential direction of the rotor body 410, and a rotor frame 430 to combine the rotor 400 with the drive shaft 80. As the rotor body 410 and rotor cores 420 define, along with the stator 300, a path of magnetic flux allowing a magnetic field formed at the stator 300 to pass therethrough, they may be formed by processing stacking metal plates through press working.

Hereinafter, a description will be given of how the rotor 400 is rotated by electromagnetic interaction between the stator 300 and rotor 400 of the motor according to the illustrated embodiment of the present invention.

As shown in FIGS. 9 and 10, the magnets 320 arranged between the stator cores 310 have alternately arranged polarities such that the portions of the magnets 320 facing each other have the same polarity, thereby allowing concentrated magnetic flux to be created in the circumferential direction of the stator 300.

The magnetic flux created by a first magnet 320a disposed between the first stator core 310a and the second stator core 310b forms a closed loop path (III) along a support 314b of the second stator core 310b adjoining the first magnet 320a, a second rotor core 420b, a rotor body 410, a first rotor core 420a, and a support 314a of the first stator core 310a adjoining the first magnet 320a, while the magnetic flux created by a second magnet 320b disposed between the second stator core 310b and the third stator core 310c forms a closed loop path (IV) along a support 314b of the second stator core 310b adjoining the second magnet 320b, a third rotor core 420c, a rotor body 410, a fourth rotor core 420d, and a support 314c of the third stator core 310c adjoining the second magnet 320b. Other magnets 320 arranged alternately with the first magnet 320a or the second magnet 320b also form the same closed loop path of magnetic flux as those of the first magnet 320a and second magnet 320b.

When AC power is applied to the first coil 330, magnetic fluxes B1 and B2 are formed around the first coil 330 in a radial direction. The magnetic fluxes B1 and B2 formed around the first coil 330 are superimposed on magnetic fluxes formed by the magnets 320 to increase the magnetic flux density or to cancel the magnetic fluxes formed by the magnets 320 to decrease the magnetic flux density. As shown in FIG. 10, the magnetic flux B1 formed around the first coil 330 decreases the density of magnetic flux formed in and around the support 314a of the first stator core 310a, and increases the density of magnetic flux formed in and around the support 314*b* of the second stator core 310*b*. Likewise, the magnetic flux B2 formed around the first coil 330 decreases the density of magnetic flux formed in and around the support 314*c* of the third stator core 310*c*, and increases the density of magnetic flux formed in and around the support 314*b* of the second stator core 310*b*.

When AC power is applied to the second coil 340, magnetic fluxes B3 and B4 are formed around the second coil 340 in a circumferential direction. The magnetic fluxes B3 and B4 formed by the second coil 340 in a circumferential direction are substantially in the same direction as or the opposite direction to that of the magnetic fluxes formed by the first magnet 320*a* or second magnet 320*b*. As shown in FIG. 10, the magnetic flux B3 formed by the second coil 340 is superimposed on the magnetic flux formed by the first magnet 320*a*, and the magnetic flux B4 formed by the second coil 340 cancels out the magnetic flux formed by the second magnet 320*b*. As such, the second coil 340 substantially increases or decreases the densities of the magnetic fluxes formed by the magnets 320.

The directions and densities of magnetic fluxes formed by the magnets 320 around the stator cores 310 including the first stator core 310*a*, second stator core 310*b* and third stator core 310*c* may be controlled by adjusting AC power applied to the first coil 330 and second coil 340, and the speed and direction of rotation of the rotor 400 may be controlled by adjusting the densities of the magnetic fluxes around the stator cores 310. Wherein the AC power is applied independently to the first coil 330 and the second coil 340 allowing for greater control of the direction and densities of the magnetic fluxes.

By using both the magnetic flux created by the magnet 320 inserted between the stator cores 110 and the magnetic fluxes created by the first coil 330 and second coil 340 wound around the stator cores 310 and the magnet 320, the density of magnetic flux formed around the stator 300 may be adjusted in a wide range as in the motor 40 according to the previous embodiment.

As is apparent from the above description, magnets are included in a stator and the intensity of magnetic flux formed by the magnets included in the stator is varied, and thereby requirements for washing and dehydration operations of a washing machine may be efficiently met.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A washing machine comprising:
   a body;
   a tub disposed within the body;
   a drum rotatably disposed within the tub; and
   a motor coupled to a rear surface of the tub to drive the drum,
   wherein the motor comprises:
      a stator including a plurality of stator cores and a plurality of magnets arranged between the stator cores; and
      a rotor rotatably disposed at an inner side or outer side of the stator,
   wherein:
      the stator comprises a core body, a plurality of supports adapted to extend from the core body in a radial direction, a first coil wound around the neighboring ones of the supports of a first one and a second one of the stator cores neighboring each other, and a second coil wound around one of the magnets disposed between neighboring ones of the plurality of supports, and
      the plurality of magnets extend partially a radial length of the plurality of stator cores and the second coil is wound around each of the plurality of magnets in the radial direction.

2. The washing machine according to claim 1, wherein the core body is shaped in a circular arc, and
   the plurality of supports are adapted to support the magnets disposed on both sides of the core body.

3. The washing machine according to claim 1, wherein the first coil is positioned at an outer side of the second coil.

4. The washing machine according to claim 1, wherein the magnets have a shorter length than the stator cores in an axial direction of the stator.

5. The washing machine according to claim 1, wherein the stator comprises an insulator to cover the stator cores and the magnets to electrically insulate the stator cores and the magnets from the first coil and the second coil.

6. The washing machine according to claim 1, wherein the rotor comprises:
   a rotor body formed in a circular shape; and
   a plurality of rotor cores adapted to extend from the rotor body in a radial direction of the rotor body, and arranged in a circumferential direction of the rotor body.

7. A washing machine comprising:
   a body;
   a tub disposed within the body;
   a drum rotatably disposed within the tub; and
   a motor comprising a stator and rotor is coupled to a rear surface of the tub to drive the drum,
   wherein the stator comprises:
      a plurality of stator cores;
      a plurality of magnets disposed between the plurality of stator cores, such that magnets disposed between neighboring stator cores among the plurality of stator cores face each other;
      a first coil wrapped around two stator cores to adjust the magnetic flux;
   wherein
   AC power applied to the coil is adjustable to allow for the direction and density of the magnetic flux to be controlled,
   the plurality of magnets extend partially a radial length of the plurality of stator cores, and
   a second coil is wrapped around each of the plurality of magnets in a radial direction of the plurality of stator cores.

8. The washing machine according to claim 7, wherein the AC power is independently applied to the first coil and the second coil to control the density and direction of the magnetic flux.

9. The washing machine according to claim 7, wherein each of the stator cores among the plurality of stator cores form a v-shape.

* * * * *